United States Patent
Finn et al.

(10) Patent No.: US 7,904,395 B2
(45) Date of Patent: Mar. 8, 2011

(54) CONSUMER RATING AND CUSTOMER SERVICE BASED THEREON WITHIN A VIRTUAL UNIVERSE

(75) Inventors: Peter G. Finn, Brampton (CA); Rick A. Hamilton, II, Charlottesville, VA (US); Neil A. Katz, Parkland, FL (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 12/136,266

(22) Filed: Jun. 10, 2008

(65) Prior Publication Data

US 2009/0307051 A1  Dec. 10, 2009

(51) Int. Cl.
*G06F 17/00* (2006.01)
*G06Q 30/00* (2006.01)

(52) U.S. Cl. .......................................... 705/500; 705/26

(58) Field of Classification Search ................ 705/1, 26; 715/706, 707, 709, 745, 751, 753, 757
See application file for complete search history.

(56) References Cited

U.S. PATENT DOCUMENTS

| 6,134,530 | A | 10/2000 | Bunting et al. |
| 6,804,345 | B1 | 10/2004 | Bala et al. |
| 6,976,056 | B1* | 12/2005 | Kumar ........................... 709/206 |
| 7,069,234 | B1* | 6/2006 | Cornelius et al. ............... 705/26 |
| 2001/0054064 | A1* | 12/2001 | Kannan ........................... 709/203 |
| 2003/0128205 | A1* | 7/2003 | Varghese ........................ 345/419 |
| 2005/0008140 | A1 | 1/2005 | Bala et al. |
| 2005/0246187 | A1* | 11/2005 | Maltzman ......................... 705/1 |
| 2005/0251553 | A1* | 11/2005 | Gottfried ........................ 709/204 |
| 2007/0101276 | A1* | 5/2007 | Yuen ............................... 715/757 |
| 2008/0040220 | A1 | 2/2008 | Levy et al. |
| 2008/0146338 | A1* | 6/2008 | Bernard et al. .................. 463/42 |
| 2008/0262911 | A1* | 10/2008 | Altberg et al. ................... 705/14 |
| 2009/0091565 | A1* | 4/2009 | Booth et al. .................... 345/419 |
| 2009/0124349 | A1* | 5/2009 | Dawson et al. ................. 463/24 |
| 2009/0125323 | A1* | 5/2009 | Lakshmanan et al. ............ 705/2 |

* cited by examiner

*Primary Examiner* — Jamisue A Plucinski
*Assistant Examiner* — Matthew Sittner
(74) *Attorney, Agent, or Firm* — William E. Schiesser; Hoffman Warnick LLC

(57) ABSTRACT

The present invention is directed to providing consumer ratings and customer service based thereon within a virtual universe. A method for providing a consumer rating and customer service within a virtual universe includes: determining a consumer habit(s) of a customer in the virtual universe and then calculating a consumer rating, based on the determination of the consumer habit(s). From the calculated consumer rating, a particular consumer service is selectively providing in the virtual universe.

20 Claims, 9 Drawing Sheets

CONSUMER RATING AND CUSTOMER SERVICE BASED THEREON WITHIN A VIRTUAL UNIVERSE

FIELD OF THE INVENTION

The present invention relates generally to improving the customer service experience in a virtual universe, and more specifically relates to providing consumer ratings and customer service, based thereon, within a virtual universe.

BACKGROUND OF THE INVENTION

A virtual environment is an interactive simulated environment accessed by multiple users through an online interface. Users inhabit and interact in the virtual environment via avatars, which are two or three-dimensional graphical representations of humanoids. There are many different types of virtual environments, however there are several features many virtual environments generally have in common:
A) Shared Space: the world allows many users to participate at once.
B) Graphical User Interface: the environment depicts space visually, ranging in style from 2D "cartoon" imagery to more immersive 3D environments.
C) Immediacy: interaction takes place in real time.
D) Interactivity: the environment allows users to alter, develop, build, or submit customized content.
E) Persistence: the environment's existence continues regardless of whether individual users are logged in.
F) Socialization/Community: the environment allows and encourages the formation of social groups such as teams, guilds, clubs, cliques, housemates, neighborhoods, etc.

An avatar can have a wide range of business and social experiences. Such business and social experiences are becoming more common and increasingly important in on-line virtual environments (e.g., universes, worlds, etc.), such as that provided in the on-line world Second Life (Second Life is a trademark of Linden Research in the United States, other countries, or both). The Second Life client program provides its users (referred to as residents) with tools to view, navigate, and modify the Second Life world and participate in its virtual economy.

Second Life and other on-line virtual environments present a tremendous new outlet for both structured and unstructured virtual collaboration, gaming, exploration, commerce, and travel, as well as real-life simulations in virtual spaces. As virtual worlds are providing a new and emerging marketplace for commerce, companies are struggling to determine how best to provide both cost effective and customer friendly methods of serving avatar patrons.

In the business arena, with the virtual world environment now competing with traditional web-based sales services, it is imperative that unique and enticing methods evolve to provide a premium customer service experience. Not only is it important that the initial virtual world-based customer purchase experience be positive, but that the customer has an ongoing, continual positive view of the experience, thereby making the avatar (and customer) more likely to return for repeat business. Certainly, 'backing' every virtual customer service representative (CSR) avatar with a real-time human CSR is very costly. Additionally, differing customer avatars concomitantly have differing requirements with respect to CSR assistance. Counterbalancing the varying needs of the customer avatars is that virtual business locations seek to be responsive, yet efficient.

Accordingly, there is an opportunity to improve upon the existing virtual universe experience.

SUMMARY OF THE INVENTION

The present invention is directed to providing consumer ratings and customer service, based thereon, within a virtual universe.

A first aspect of the present invention is directed to a method for providing a consumer rating and customer service within a virtual universe, comprising: determining a consumer habit of a customer in the virtual universe; calculating a consumer rating, based on the determining; and selectively providing customer service in the virtual universe based on the consumer rating.

A second aspect of the present invention is directed to a system for providing a consumer rating and customer service within a virtual universe, comprising: a component for determining a consumer habit of a customer in the virtual universe; a calculator for calculating a consumer rating, based on the determining; and a component for selectively providing customer service in the virtual universe based on the consumer rating.

A third aspect of the present invention is directed to a program product stored on a computer readable medium, which when executed, provides a consumer rating and customer service within a virtual universe, the computer readable medium comprising program code for: determining a consumer habit of a customer in the virtual universe; calculating a consumer rating, based on the determining; and selectively providing customer service in the virtual universe based on the consumer rating.

A fourth aspect of the present invention is directed to a method for deploying an application for providing a consumer rating and customer service within a virtual universe comprising: providing a computer infrastructure being operable to: determine a consumer habit of a customer in the virtual universe; calculate a consumer rating, based on the determining; and selectively provide customer service in the virtual universe based on the consumer rating.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
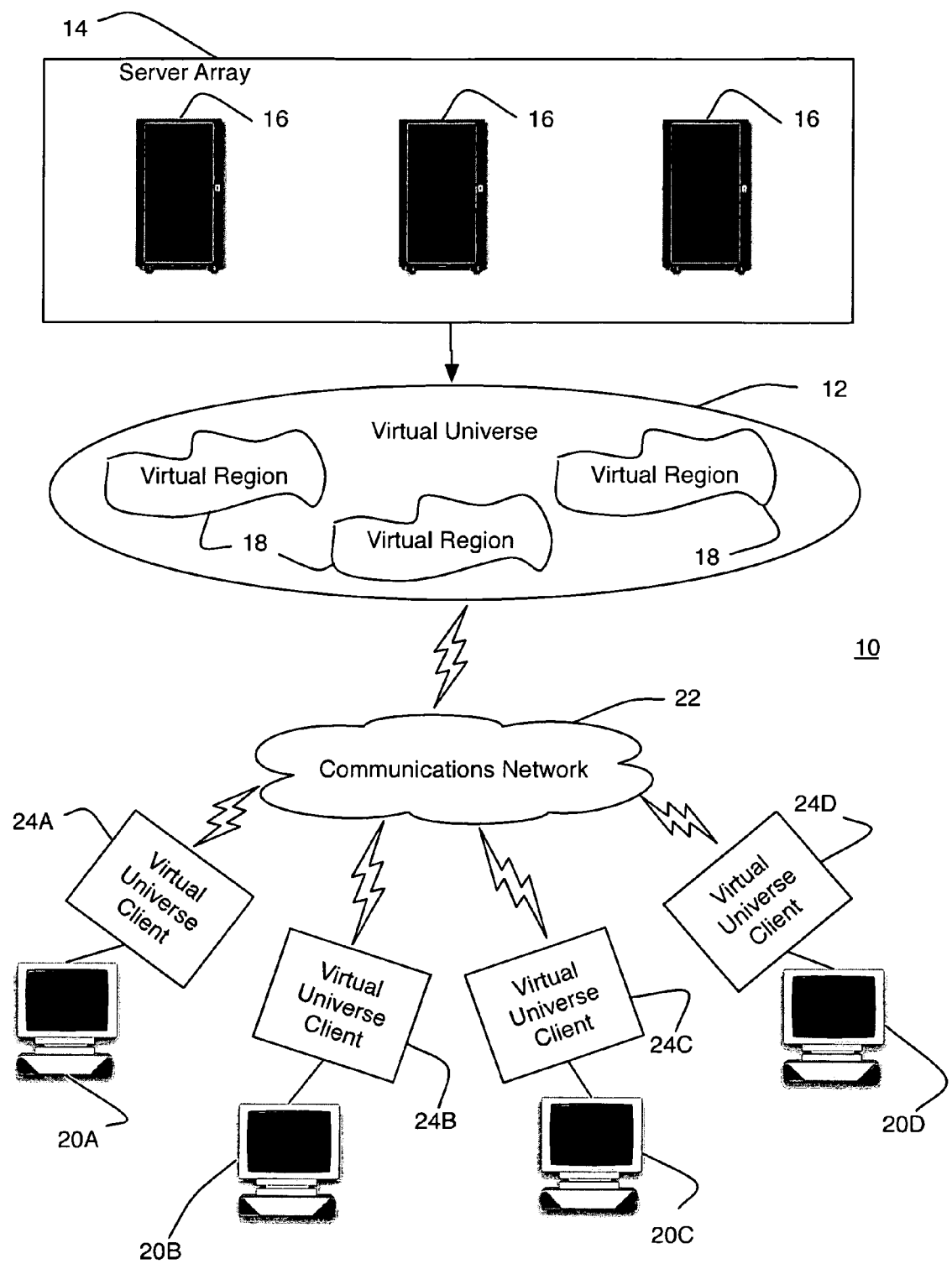
FIG. 1 depicts a high-level schematic diagram showing a networking environment for providing a virtual universe in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention provides consumer ratings and customer service, based thereon, within a virtual universe. Aspects of the invention provide a system and method to determine appropriate service level for the customer avatar and execute based on such individual requirements. This is accomplished through a consumer rating system and/or service entry points that determine the level of service each individual avatar, or group of avatars, receives based on their respective ratings. Aspects of the invention includes a system for determining customer avatar habits, rating the avatar based on such habits, and providing individualized customer services based on such a rating. In another embodiment, a notification mechanism is provided when it is desirable to have a real-time customer service representative (CSR) back the virtual CSR avatar.

FIG. 1 shows a high-level schematic diagram showing a networking environment 10 for providing a virtual universe 12 according to one embodiment of this invention in which a service for providing consumer ratings and customer service, based thereon, within a virtual universe can be utilized. As shown in FIG. 1, the networking environment 10 comprises a server array or grid 14 comprising a plurality of servers 16 each responsible for managing a portion of virtual real estate within the virtual universe 12. A virtual universe provided by a typical massive multiplayer on-line game can employ thousands of servers to manage all of the virtual real estate. The content of the virtual real estate that is managed by each of the servers 16 within the server array 14 shows up in the virtual universe 12 as a virtual region 18. Like the real-world, each virtual region 18 within the virtual universe 12 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe. FIG. 1 also shows that users operating computers 20 (e.g., 20A, 20B, 20C, 20D) interact with the virtual universe 12 through a communication network 22 via a virtual universe client 24 (e.g., 24A, 24B, 24C, 24D) that resides in the computer. Below are further details of the virtual universe 12, server array 14, and virtual universe client 24A, 24B, 24C, 24D.

Figure 2:
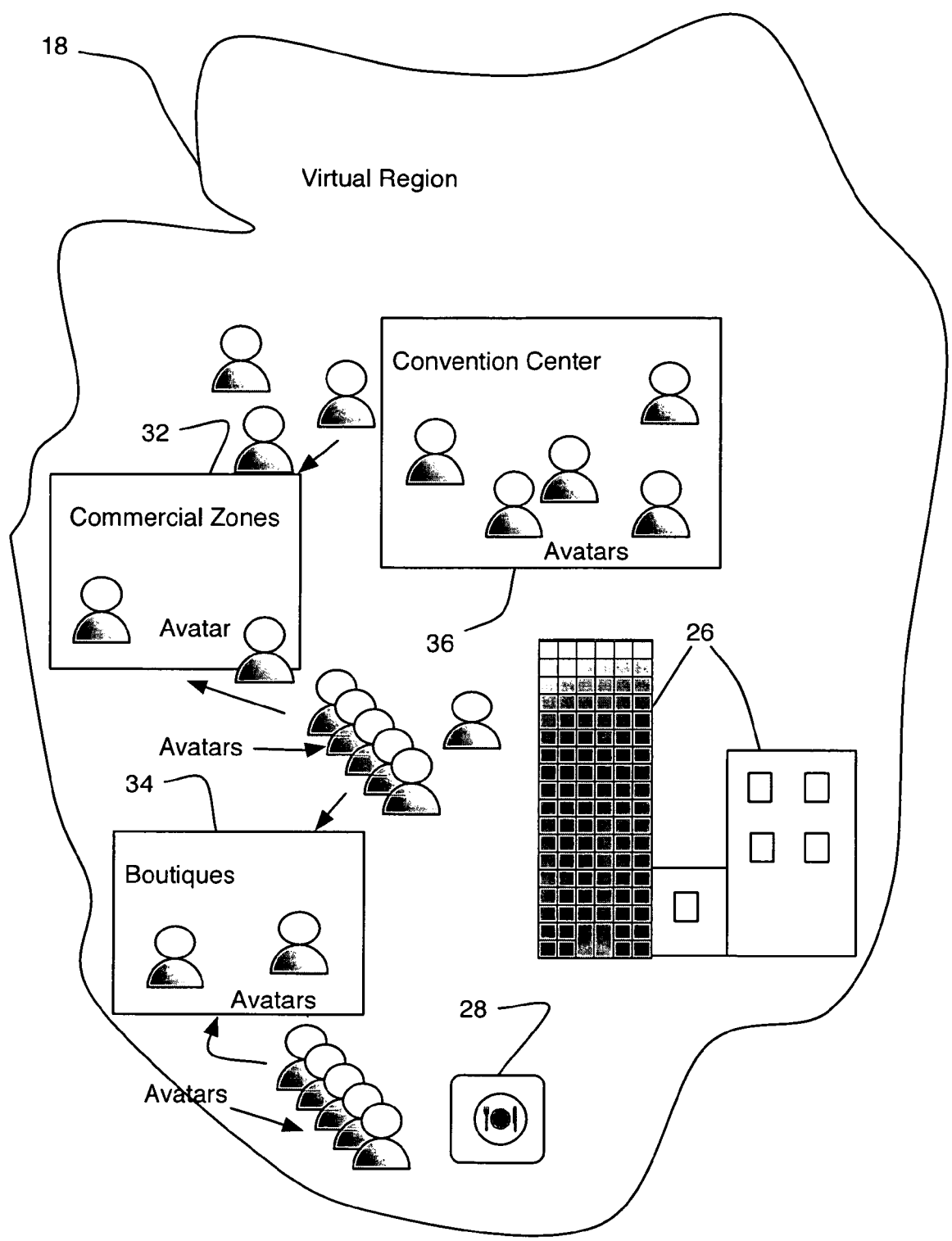
FIG. 2 depicts a more detailed view of a virtual region shown in the virtual universe of FIG. 1 in accordance with an embodiment of the present invention.

FIG. 2 shows a more detailed view of a virtual region shown 18 in the virtual universe 12 of FIG. 1 with avatars concentrated in various locations of the virtual region. As an example, the virtual region 18 shown in FIG. 2 comprises a downtown office center 26, restaurants 28 commercial zones 32 and boutiques 34 for shopping and a convention center 36 for meetings and various conventions. Also located in the virtual region 18 and/or within the various sub-elements (e.g., downtown office center 26, restaurants 28 commercial zones 32 and boutiques 34, convention center 36, etc.) may be an information location 40. These examples of items in the virtual region 18 shown in FIG. 2 are only illustrative of some things that may be found in a virtual region 18 and those skilled in the art will recognize that these regions can have many more items that can be found in a real-life universe as well as things that do not presently exist in real life.

Residents or avatars which as mentioned above are personas or representations of the users of the virtual universe, roam all about the virtual region by walking, driving, flying or even by teleportation or transportation which is essentially moving through space from one point to another, more or less instantaneously. As shown in FIG. 2, there is a concentration of avatars in or near the convention center 36, and there are a several avatars at or near the commercial zones 32 and at the boutique 34 and none at the downtown office center 26 and restaurants 28. Several avatars and/or a group of avatars are queued up to enter the commercial zone 32 and/or the boutique 34. In any event, aspects of the method provide consumer ratings and customer service, based thereon, within the virtual universe 12.

Figure 3:
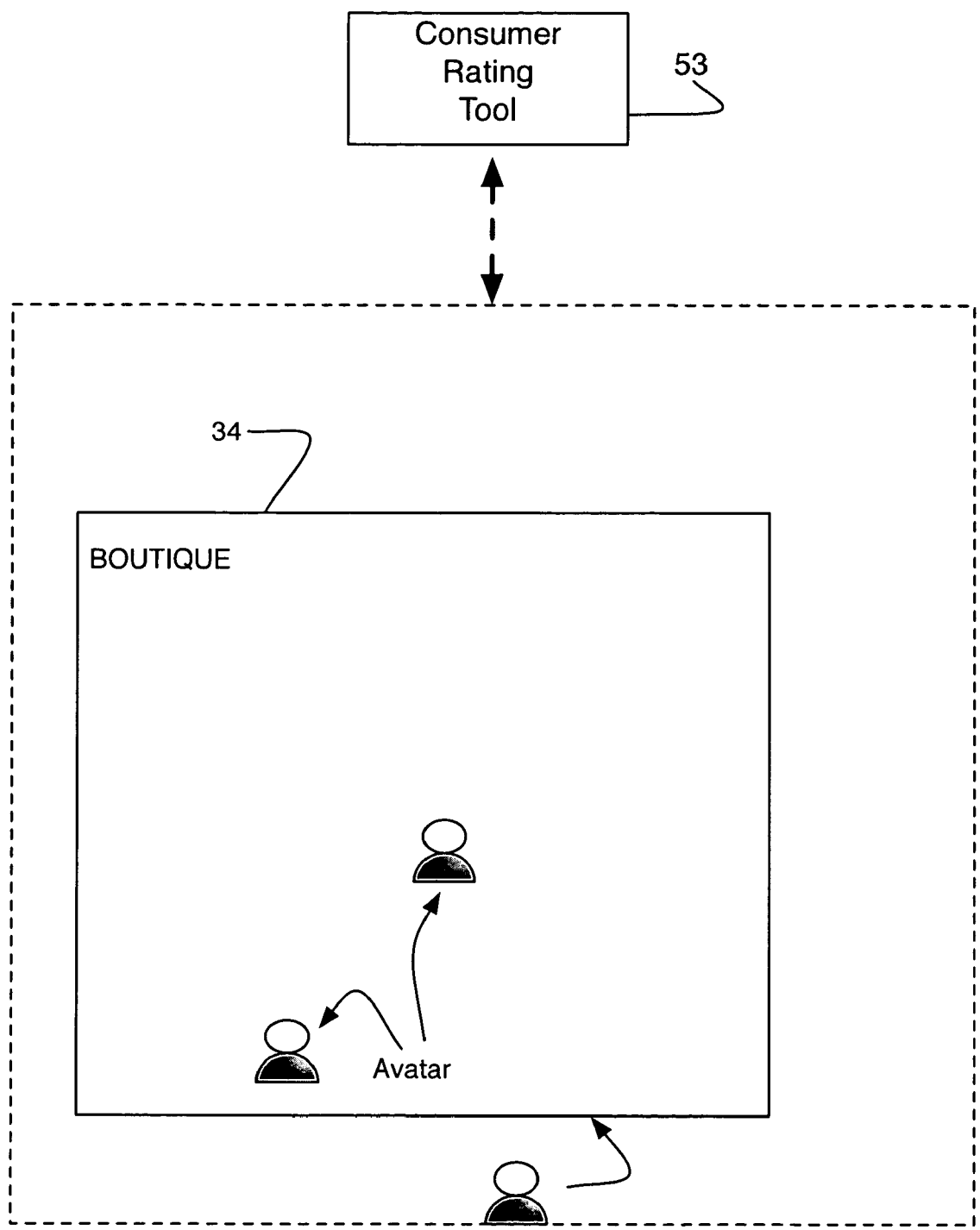
FIG. 3 depicts a more detailed view of a portion of the virtual region shown in FIG. 2 in accordance with an embodiment of the present invention.

As more specifically shown in FIG. 3, an avatar, or group of avatars, may desire to conduct commerce (e.g., use a boutique 34) within the virtual universe 12. For example, two avatars in FIG. 3 may be in a boutique 34 and have a particular commercial desire. Similarly, a third avatar may be entering the same boutique 34 with his/her own commercial intent, as shown in FIG. 3. The owner or provider of the boutique 34 may wish to provide quality customer service to the avatars, while also rewarding the commercial fidelity of certain avatars.

Figure 4:
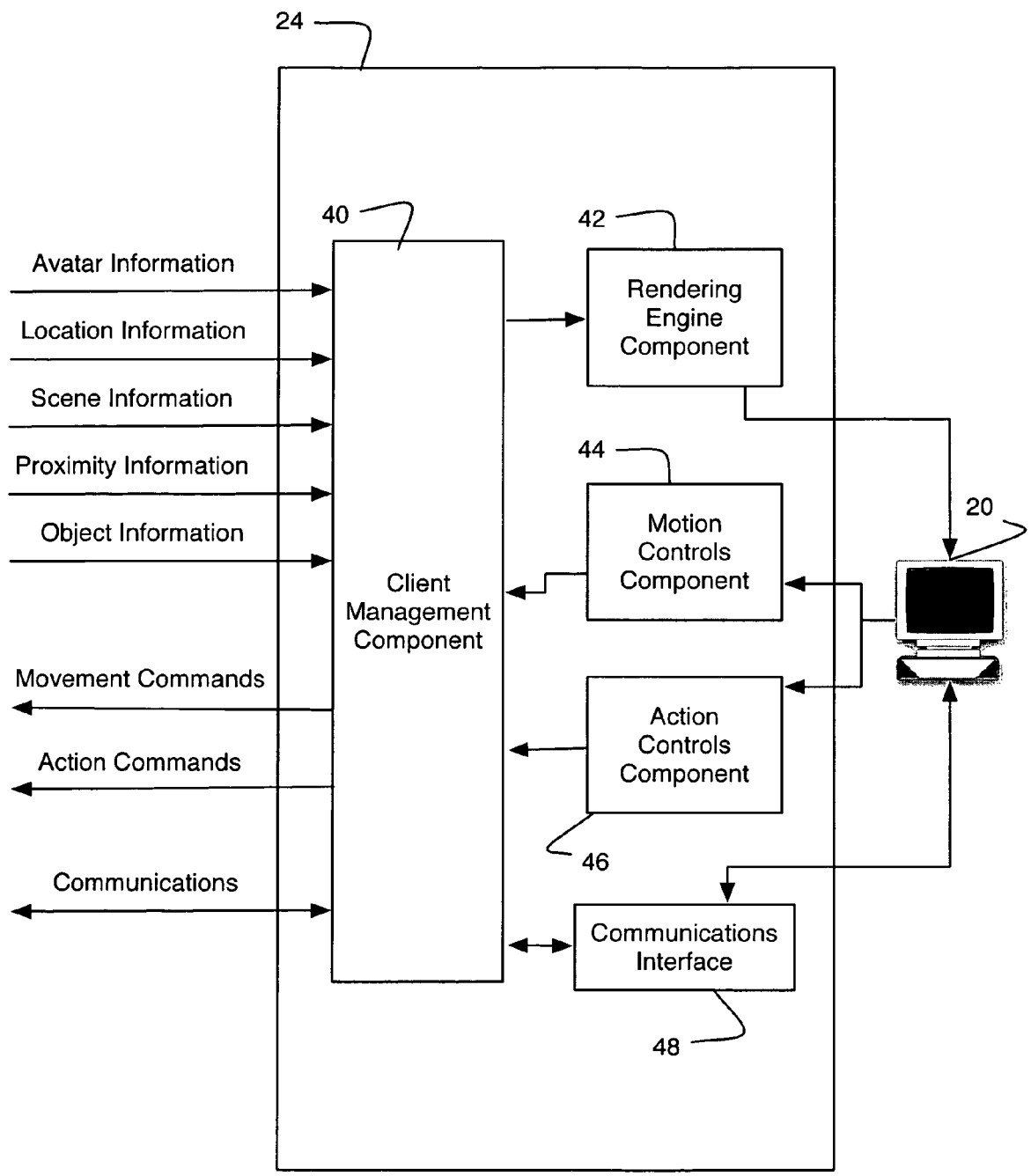
FIG. 4 depicts a more detailed view of the virtual universe client shown in FIG. 1 in accordance with an embodiment of the present invention.

FIG. 4 shows a more detailed view of the virtual universe client 24A, 24B, 24C, 24D shown in FIG. 1. The virtual universe client 24, which enables users to interact with the virtual universe 12, comprises a client management component 40, which manages actions, movements and communications made by a user through computer 20, and information received from the virtual universe through the server array 14. A rendering engine component 42 enables the user of the computer 20 (e.g., 20A, 20B, 20C, 20D) to visualize his or her avatar within the surroundings of the particular region of the virtual universe 12 that it is presently located. A motion controls component 44 enables the user to make movements through the virtual universe. In one embodiment, movements through the virtual universe can include for example, gestures, postures, walking, running, driving, flying, etc.

An action controls component 46 enables the user to perform actions in the virtual universe such as buying items for his or her avatar or even for their real-life selves, building homes, planting gardens, etc., as well as changing the appearance of their avatar. These actions are only illustrative of some possible actions that a user can perform in the virtual universe and are not limiting of the many possible actions that can be performed. A communications interface 48 enables a user to communicate with other users of the virtual universe 12 through modalities such as chatting, instant messaging, gesturing, talking and email.

FIG. 4 shows various information that may be received by the client management component 40 from the virtual universe through the server array 14. In particular, the client management component 40 receives avatar information about the avatars that are in proximity to the user's avatar. In addition, the client management component 40 receives location information about the area that the user's avatar is near (e.g., what region or island he or she is in) as well as scene information (e.g., what the avatar sees). The client management component 40 also receives proximity information which contains information on what the user's avatar is near and object information which is information that can be obtained by one's senses (e.g., touch, taste, smell, etc.,) and what actions are possible for nearby objects (e.g., postures, movements). FIG. 4 also shows the movement commands and action commands that are generated by the user that are sent to the server array via the client management component 40, as well as the communications that can be sent to the users of other avatars within the virtual universe.

Figure 5:
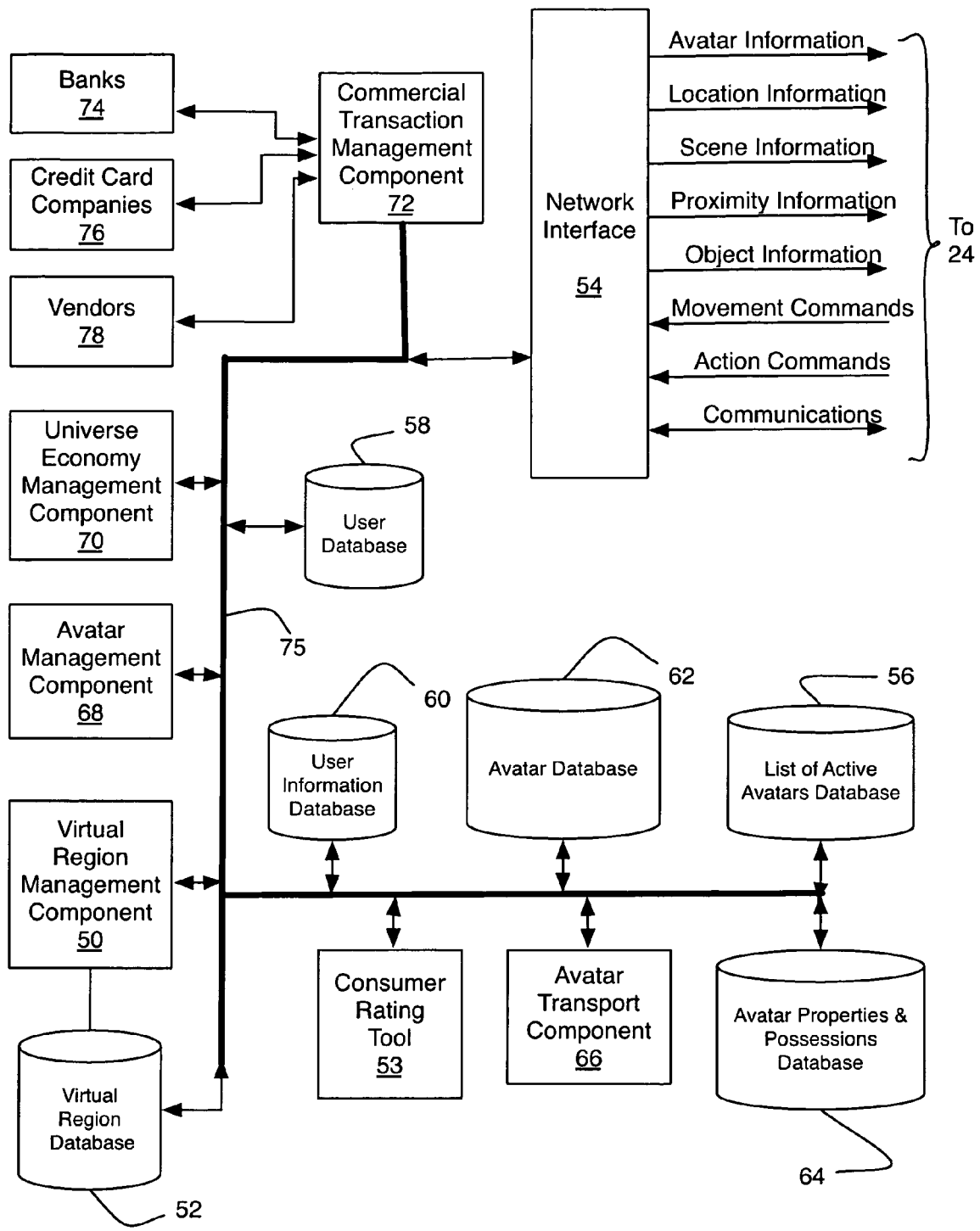
FIG. 5 depicts a more detailed view of some of the functionalities provided by the server array shown in FIG. 1 in accordance with an embodiment of the present invention.

FIG. 5 shows a more detailed view of some of the functionalities provided by the server array 14 shown in FIG. 1. In particular, FIG. 5 shows a virtual region management component 50 that manages a virtual region within the virtual universe. In particular, the virtual region management component 50 manages what happens in a particular region such as the type of landscape in that region, the amount of homes, commercial zones, boutiques, bridges, highways, streets, parks, restaurants, etc. A virtual region database 52 stores information on all of the items in the virtual region 18 that the virtual region management component 50 is managing. In one embodiment, for very large virtual universes, one server 16 may be responsible for managing one particular virtual region 18 within the universe. In other embodiments, it is possible that one server 16 may be responsible for handling one particular island within the virtual region 18.

A consumer rating tool 53 provides consumer ratings and customer service, based thereon, in the virtual universe 12. Below is a more detailed discussion of the consumer rating tool 53 and how it provides consumer ratings and customer service, based thereon, within a virtual universe 12, including a discussion on how the tool 53 determines a consumer habit of a customer in the virtual universe 12; calculates a consumer rating based on the determining of habits; and, selectively providing customer service (e.g., virtual CSR avatar, a live-real-time CSR to back the virtual CSR avatar, etc.) in the virtual universe 12 based on the calculated consumer rating.

FIG. 5 shows a network interface 54 that enables the server array 14 to interact with the virtual universe client 24 residing on computer 20. In particular, the network interface 54 communicates information that includes information pertaining to avatars, location, trajectory, scene, proximity and objects to the user through the virtual universe client 24 and receives movement and action commands as well as communications from the user via the universe client.

As shown in FIG. 5, there are several different databases for storing information. In particular, database 56 contains a list of all the avatars that are on-line in the virtual universe 12. Databases 58 and 60 contain information on the actual human users of the virtual universe 12. In one embodiment, database 58 contains general information on the users such as names, addresses, interests, ages, etc., while database 60 contains more private information on the users such as email addresses, billing information (e.g., credit card information) for taking part in transactions. Databases 62 and 64 contain information on the avatars of the users that reside in the virtual universe 12. In one embodiment, database 62 contains information such as all of the avatars that a user may have, the profile of each avatar, avatar characteristics (e.g., appearance, voice and movement features), while database 64 contains an inventory listing properties and possessions that each avatar owns such as houses, cars, sporting equipment, appearance, attire, etc. Those skilled in the art will recognize that databases 58-64 may contain additional information if desired. Although the above information is shown in FIG. 5 as being stored in databases, those skilled in the art will recognize that other means of storing information can be utilized.

An avatar transport component 66 enables individual avatars to transport, which as mentioned above, allows avatars to transport through space from one point to another point, instantaneously. For example, avatars could teleport to an art exhibit held in a museum held in Greenland.

An avatar management component 68 keeps track of what on-line avatars are doing while in the virtual universe. For example, the avatar management component 68 can track where the avatar presently is in the virtual universe, what activities it is performing or has recently performed. An illustrative but non-exhaustive list of activities can include shopping, eating, talking, recreating, etc.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have their own currency that users pay for with real-life money. The users can then take part in commercial transactions for their avatars through the universe economy management component 70. In some instances, the user may want to take part in a commercial transaction that benefits him or her and not their avatar. In this case, a commercial transaction management component 72 allows the user to participate in the transaction. For example, while walking around a commercial zone, an avatar may see a pair of shoes that he or she would like for themselves and not their avatar. In order to fulfill this type of transaction and others similarly related, the commercial transaction management component 72 interacts with banks 74, credit card companies 76 and vendors 78 to facilitate such a transaction.

The components in FIG. 5 are all interconnected via an interconnect 75. Although shown in FIG. 5 as connected via interconnect 75, all of the components may be configured to interact with each other using other means now known or later developed. The components that are shown as being interconnected via interconnect 75 are illustrated in that manner to convey the close interactions that exist between these components such as the banks 74, credit card companies 76, and vendors with the commercial transaction management component 72.

Figure 6:
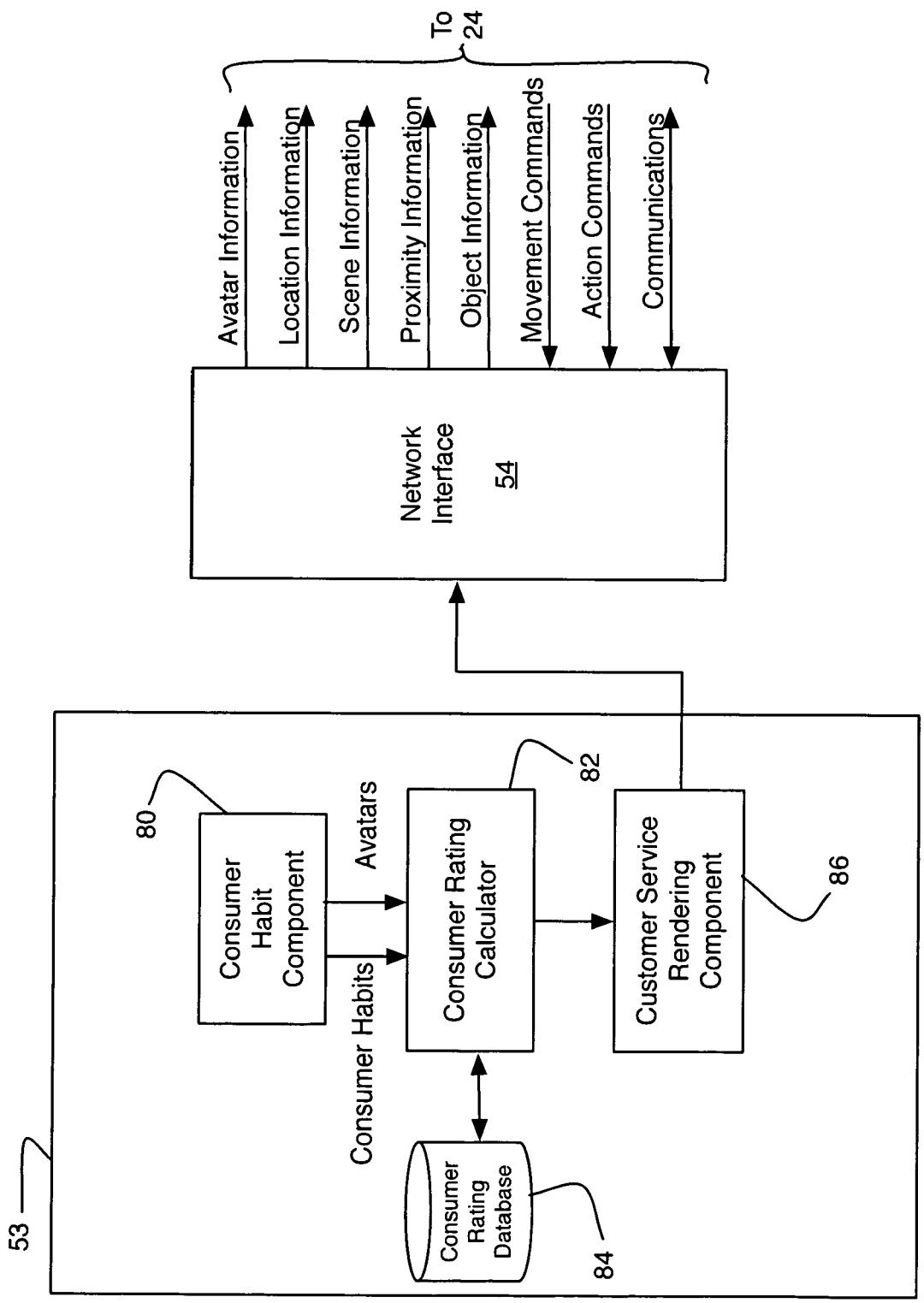
FIG. 6 depicts a more detailed view of the consumer rating tool in FIG. 5 in accordance with an embodiment of the present invention.

FIG. 6 shows a more detailed view of a consumer rating tool 53 shown in FIG. 5 according to one embodiment of this invention. As mentioned above, the consumer rating tool 53 provides consumer ratings and customer service, based thereon, within a virtual universe 12. As shown in FIG. 6, in one embodiment, the consumer rating tool 53 resides on a computer system that is a part of the server array 14 and communicates directly to the virtual universe and its residents via the virtual universe client 24. In other embodiments, the consumer rating tool 53 might reside on separate computers in direct communication with the virtual universe servers 16 and universe clients 24.

The consumer rating tool 53 comprises a consumer habit component 80 configured to determine a consumer habit of a customer (e.g., avatar) in the virtual universe 12. For example, referring back to FIG. 3, the consumer habit component may determine what activities (e.g., purchases, activities, return of goods, etc.) a consumer avatar may make in the boutique 34, or other location of commerce (e.g., auction, fair, mall, store, etc.). In this manner, the consumer habit component 80 can track a consumer session of the consumer avatar. The activities, purchases, consumer session, and/or the like may be stored in the consumer rating database 84.

The consumer habit component 80 may further monitor a location (e.g., virtual universe island, virtual fair, virtual mall, virtual business, etc.) in the virtual universe 12 for customer activity. Upon detection of the monitored location for a particular consumer activity, the consumer habit component may notify the consumer rating calculator 82 to extract from the consumer rating database 84 a current consumer rating of the customer. If no current consumer rating is available, the consumer rating calculator 82 may assign a consumer rating of zero (0) to the customer and/or notify the customer service rendering component 86 to provide to the customer a live, real-time CSR to back a virtual CSR avatar. In this manner, the customer's first commerce experience with have maximum customer service provided. For example, referring back to FIG. 3, a location (denoted by dotted line) may allow the consumer rating tool 53 to determine that an avatar has entered; exited; and/or the like the boutique 34 as shown.

A consumer rating calculator 82 is configured to receive the consumer habit(s) from the consumer habit component 80 and use this data (e.g., purchases, return of goods, etc.) to calculate and/or recalculate a consumer rating for the avatar. In particular, the consumer rating calculator 82 may store the consumer rating(s) in a consumer rating database 84. The consumer rating calculator 82 may further provide to the customer service rendering component 86 information (e.g., consumer rating, consumer entry point, etc.) so that an adequate amount of customer service is provided in the virtual universe to the customer.

The consumer rating database 84 coupled to the consumer rating calculator 82 contains data such as avatar's current consumer rating, a historical record of the avatar's consumer rating, consumer entry point, and/or the like. Although not shown in FIG. 6, the consumer rating database 84 may receive information directly from other components in the virtual universe server 16 such as location information, scene information, proximity information, object information, etc. A sample of a table (Table 1) that may be stored in the consumer rating database 84 is shown below. Table 1:

| Avatar Name | Avatar ID | Avatar History | Rating |
| --- | --- | --- | --- |
| Suzie Sue | 13692 | 0; 5; 5; 2; 5 | 5 |
| Joey Joe | 51443 | 0; 2; 1; 1; 1 | 1 |

The consumer rating database 84 may further contain current data for service entry points based on the consumer rating. The consumer entry point may include a hierarchical presentation to the avatar consumer of various consumer service representative help. For example, Table-2 shows one exemplary avatar service entry point table. Table 2:

| Rating | Customer Service Entry Point | Customer Service Status | Rationale |
| --- | --- | --- | --- |
| 0 | Contact Live CSR | Contract live CSR | New client |
| 1 | Low Service entry Point | Low service entry point | Client waste |

-continued

| Rating | Customer Service Entry Point | Customer Service Status | Rationale |
| --- | --- | --- | --- |
| 2 | FAQ entry point | FAQ entry point | Client typical |
| 3 | Web entry point | Web entry point | Client typical |
| 4 | BOT entry point | BOT entry point | Client typical |
| 5 | Contact live CSR | Contact live CSR | Premium Client |

Aspects of the present invention establish varying levels of customer service based on individual consumer avatar history. While a variety of scoring criteria are possible under aspects of the present invention, calculating the consumer session may consider some of the following criteria: entry point score at the start of the consumer session (i.e., entry point method); determining if the consumer session was successfully executed using the entry point method; whether it was necessary to contact a live, real-time human CSR from another entry point; how much time did the avatar require during the consumer session (with differing evaluation methods for automated and live assistance); whether the avatar ultimately made a purchase (e.g., may increment or decrement the score). In an embodiment, each of these elements may be associated with a sliding scale of values which would be used to determine the consumer avatar's new rating.

Referring back to FIG. 6, the consumer rating tool 53 further comprises a customer service rendering component 86 configured to selectively provide customer service to the customer in the virtual universe 12 based on the calculated consumer rating. The customer service rendering component 86 is configured to provide a physical rendering of any one of the requisite responses to the customer need request. In various embodiments, the rendering can be of, for example, a virtual CSR avatar, a live, real-time CSR backing the CSR avatar, combinations thereof, and/or the like.

Figure 7A:
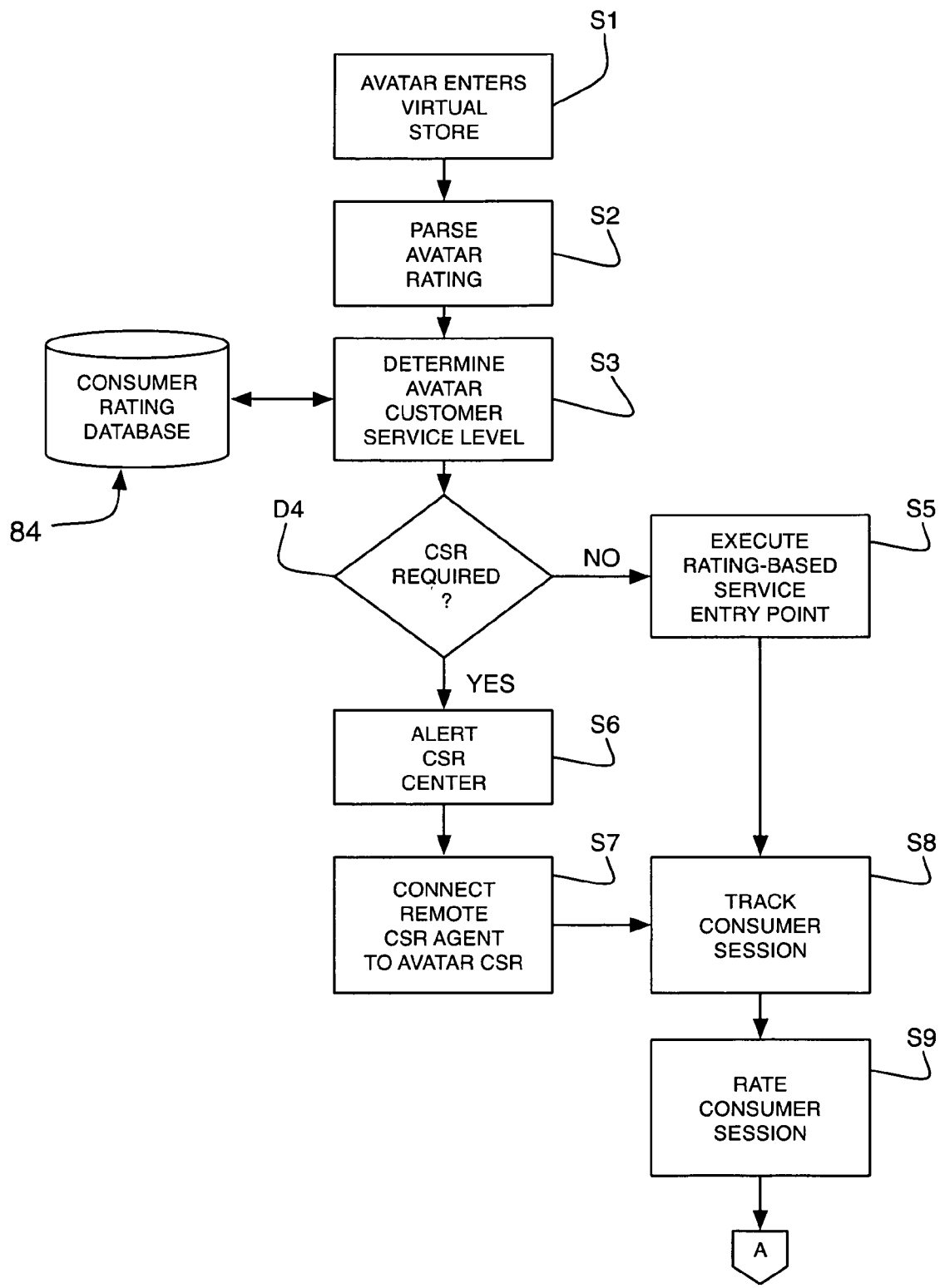
FIG. 7A depicts a first portion of a process flow for providing consumer ratings and customer service within a virtual universe in accordance with an embodiment of the present invention.
Figure 7B:
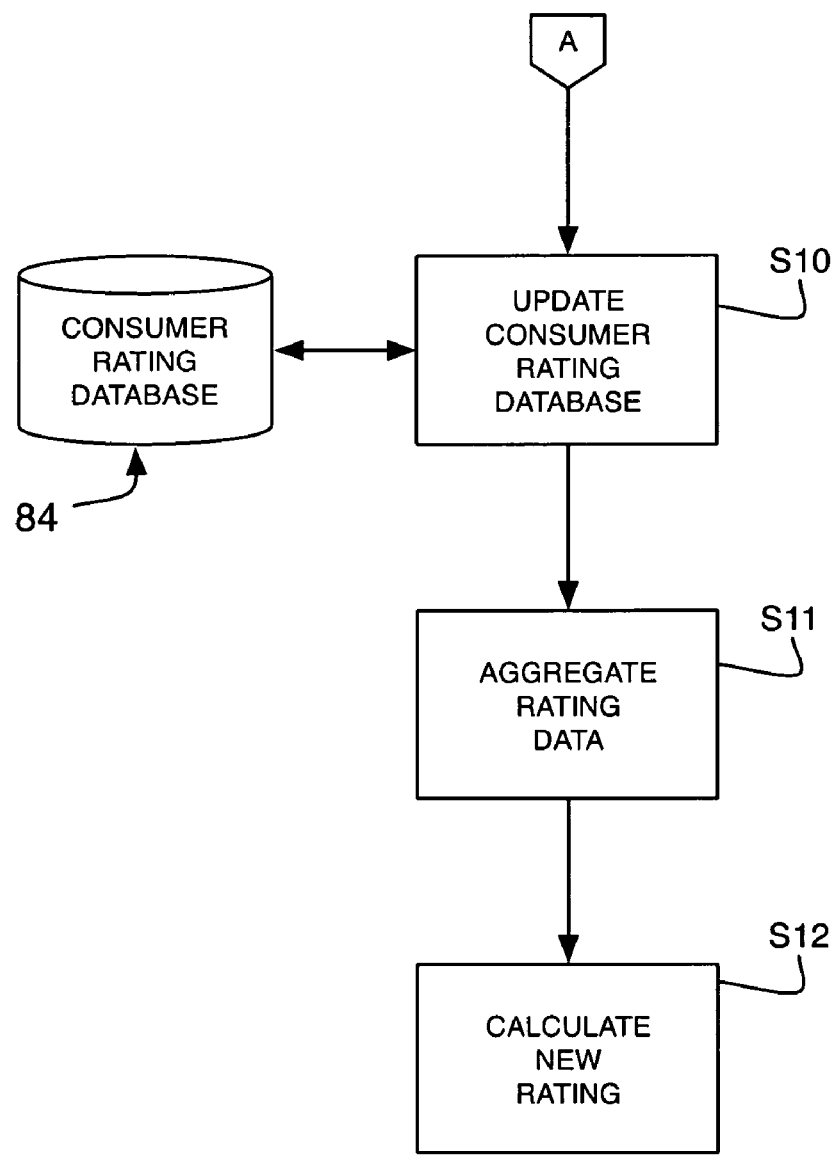
FIG. 7B depicts a second portion of the process flow in FIG. 7A in accordance with an embodiment of the present invention.

Referring to FIGS. 7A and 7B, which depict an embodiment of a method of providing consumer ratings and customer service, based thereon, within a virtual universe 12. As discussed herein an avatar, or group of avatars, may enter a virtual store (e.g., boutique 34 FIG. 3) at S1. A location trigger may use logic here to determine if the avatar, or group of avatars, has entered a particular region of interest to a particular business. For example, the particular region of interest may be a virtual universe 12 island, a specific region (e.g., a virtual fair, auction, etc.), a virtual mall, a virtual business and/or the like.

At S2, upon the avatar tripping a monitored location trigger, the avatar's rating is parsed. A portion of the consumer rating calculator (e.g., rating parser) 82 can read from the consumer rating database 84 the avatar's history based on avatar name or ID in order to extract a current consumer rating for the avatar. In an embodiment, if the avatar has no history, a rating of zero ("0") is assigned to that avatar and/or a live CSR assists the avatar in order to make their first consumer experience as satisfactory as possible. Contrastingly, if the avatar has a history in the consumer rating database 84, then a service entry point is established based on the current consumer rating.

At S3, the consumer rating calculator determines the appropriate customer service level avatar that should be provided. Information obtained from the consumer rating database 84 may aid this determination. If a CSR is required (i.e., "Yes" at D4), at S6 a customer service representative center is contacted. At S7 a remote, live, real-time CSR agent is connected (e.g., back up to) to the avatar CSR. Contrastingly, if a CSR is not required (i.e., "No" at D4), at S5 the consumer rating calculator 82 in consort with the customer rendering component 86 executes a rating-based service entry point.

In any event, at S8 the consumer session is tracked by the consumer habit component 80. The consumer habit component, at S9, rates the consumer session. The rating of the consumer session may include, for example, factoring in a consumer point score that the customer had at the initiation of the consumer session; whether the consumer session is successfully executed using an entry point method; whether a live, real-time human CSR was used during the consumer session; whether the consumer avatar made a purchases; and/or the like.

In any event, at S10 the consumer rating database 84 is updated. At S11, the consumer rating data is aggregated, whereby at S12 a new rating is calculated.

In another embodiment of this invention, the consumer rating tool 53 is used as a service to charge fees for each user, or group of users, that seeks help for rating customers and providing customer service based on the ratings. In this embodiment, the provider of the virtual universe or a third party service provider could offer this consumer rating tool 53 as a service by performing the functionalities described herein on a subscription and/or fee basis. In this case, the provider of the virtual universe or the third party service provider can create, deploy, maintain, support, etc., the consumer service tool 53 that performs the processes described in the invention. In return, the virtual universe or the third party service provider can receive payment from the virtual universe residents via the universe economy management component 70 and the commercial transaction management component 72.

In still another embodiment, the methodologies disclosed herein can be used within a computer system to provide consumer ratings and customer service, based thereon, within a virtual universe. In this case, the consumer rating tool 53 can be provided and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 8:
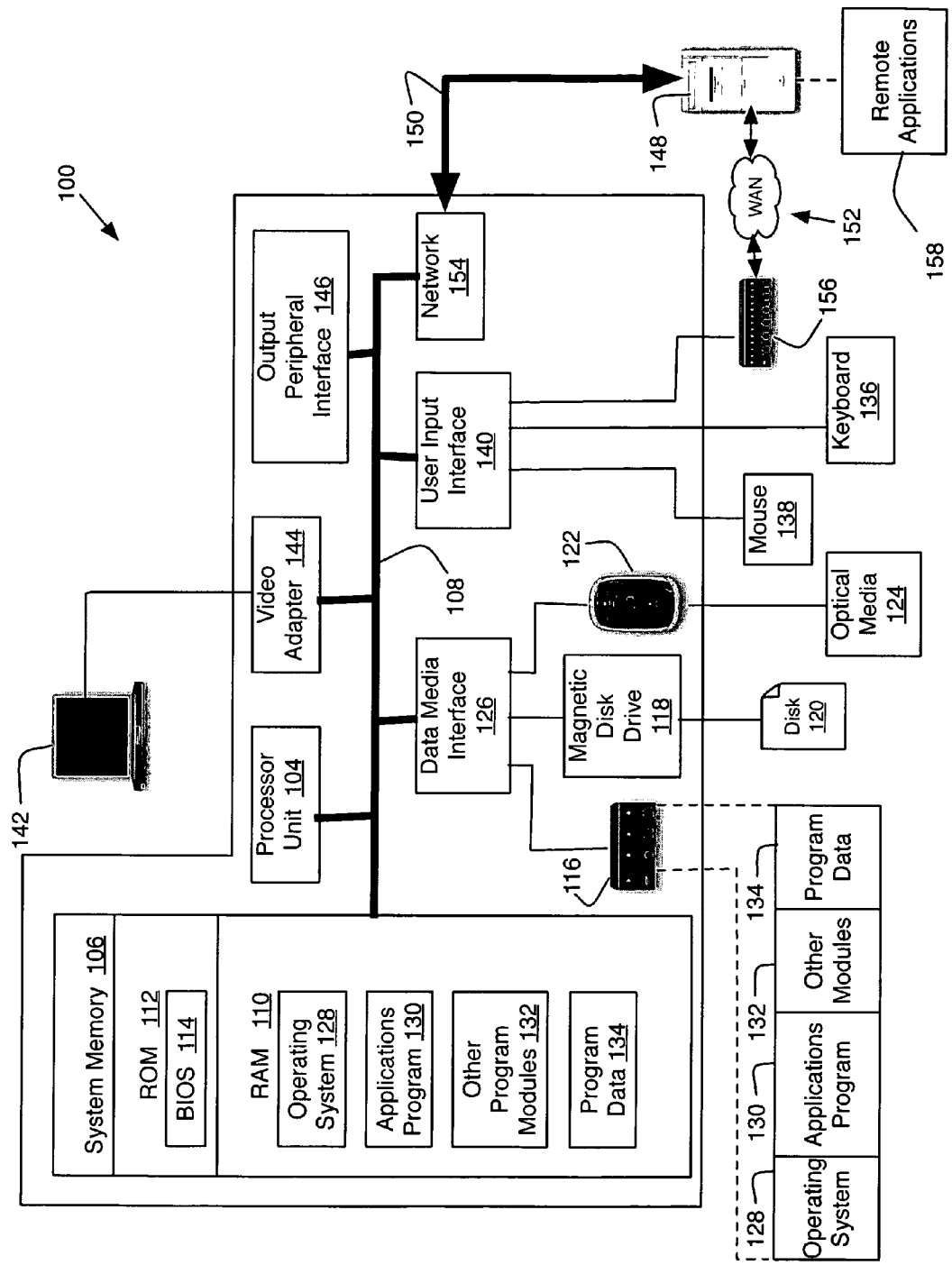
FIG. 8 depicts an illustrative computer system for implementing embodiment(s) of the present invention.

FIG. 8 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 8.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable customer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 8, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 8, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 8 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130 (e.g., consumer habit component 80, consumer rating calculator 82, customer service rendering components, 86, etc.), other program modules 132, and program data 134. Each of the operating system 128, one or more application programs 130 (e.g., consumer habit component 80, consumer rating calculator 82, customer service rendering components, 86, etc.), other program modules 132, and program data 134 or some combination thereof, may include an implementation of the networking environment 10 of FIG. 1 including the server array 14, the virtual universe client 24 and the customer rating tool 53.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 8 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 8 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for providing consumer ratings and customer service, based thereon, in a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for providing a consumer rating and customer service within a virtual universe, comprising:
   determining, using a computing device, a consumer habit of a customer in the virtual universe at a start of a consumer session;
   determining, using the computing device, a consumer rating, based on determining the consumer habit;
   selectively providing, using the computing device, customer service in the virtual universe based on the consumer rating during the consumer session;
   tracking the consumer session;
   calculating a consumer rating for the consumer session using a combination of:
      a point score for the consumer at a start of the consumer session;
      a rating corresponding to whether the consumer session was successfully executed using the point score for the consumer at the start of the consumer session;
      a rating corresponding to whether a real-time customer service representative (CSR) external to the virtual universe was used during the consumer session; and
      a rating corresponding to whether a purchase was made by the customer during the consumer session; and
   updating a database with the calculated consumer rating for the consumer session.

2. The method of claim 1, further comprising:
   monitoring a location in the virtual universe for a customer activity.

3. The method of claim 2, the monitoring further comprising:
   upon detecting the customer activity at the monitored location, extracting a current consumer rating of the customer, else assigning the consumer a rating of zero if no current consumer rating exists and providing a real-time customer service representative (CSR) external to the virtual universe to back a virtual CSR avatar.

4. The method of claim 1, the selectively providing further comprising determining what level customer service representative (CSR) to provide to the customer.

5. The method of claim 4, further comprising determining if a real-time customer service representative (CSR) external to the virtual universe is required to back a virtual CSR avatar.

6. The method of claim 5, if the real-time CSR is determined to be required, then notifying a CSR center.

7. The method of claim 1, the selectively providing further comprising executing a consumer rating-based consumer service entry point.

8. The method of claim 1, further comprising storing the consumer habit in a database.

9. The method of claim 1, wherein the customer service includes providing a customer service representative (CSR) avatar.

10. The method of claim 1, wherein a real-time human customer service representative (CSR) external to the virtual universe is triggered based on one of the consumer rating and a location of the customer in the virtual universe.

11. A system for providing a consumer rating and customer service within a virtual universe, comprising:
at least one computing device, including:
a component for determining a consumer habit of a customer in the virtual universe at a start of a consumer session;
a calculator for determining a consumer rating, based on determining the consumer habit;
a component for selectively providing customer service in the virtual universe based on the consumer rating during the consumer session;
a component for tracking the consumer session, wherein a consumer rating for the consumer session is calculated by the calculator using a combination of:
a point score for the consumer at a start of the consumer session;
a rating corresponding to whether the consumer session was successfully executed using the point score for the consumer at the start of the consumer session;
a rating corresponding to whether a real-time customer service representative (CSR) external to the virtual universe was used during the consumer session; and
a rating corresponding to whether a purchase was made by the customer during the consumer session; and
a component for updating a database with the calculated consumer rating for the consumer session.

12. The system of claim 11, further comprising:
a component for monitoring a location in the virtual universe for a customer activity.

13. The system of claim 11, wherein a real-time customer service representative (CSR) external to the virtual universe is triggered based on one of the consumer rating and a location of the customer in the virtual universe.

14. The system of claim 11, the component for selectively providing further comprising a component for executing a consumer rating-based consumer service entry point.

15. A program product stored on a non-transitory computer readable medium, which when executed by a computing device, provides a consumer rating and customer service within a virtual universe, the computer readable medium comprising program code for:
determining a consumer habit of a customer in the virtual universe at a start of a consumer session;
determining a consumer rating, based on determining the consumer habit;
selectively providing customer service in the virtual universe based on the consumer rating during the consumer session;
tracking the consumer session;
calculating a consumer rating for the consumer session using a combination of:
a point score for the consumer at a start of the consumer session;
a rating corresponding to whether the consumer session was successfully executed using the point score for the consumer at the start of the consumer session;
a rating corresponding to whether a real-time customer service representative (CSR) external to the virtual universe was used during the consumer session; and
a rating corresponding to whether a purchase was made by the customer during the consumer session; and
updating a database with the calculated consumer rating for the consumer session.

16. The program product of claim 15, the program code further comprising:
monitoring a location in the virtual universe for a customer activity.

17. The program product of claim 16, the monitoring further comprising:
upon detecting the customer activity at the monitored location, extracting a current consumer rating of the customer, else assigning the consumer a rating of zero if no current consumer rating exists and providing a real-time customer service representative (CSR) external to the virtual universe to back a virtual CSR avatar.

18. The program product of claim 15, the selectively providing further comprising executing a consumer rating-based consumer service entry point.

19. The program product of claim 15, wherein a real-time customer service representative (CSR) external to the virtual universe is triggered based on one of the consumer rating and a location of the customer in the virtual universe.

20. A method for deploying an application for providing a consumer rating and customer service within a virtual universe, comprising:
providing a computer infrastructure including a computing device being operable to:
determine a consumer habit of a customer in the virtual universe at a start of a consumer session;
determine a consumer rating, based on determining the consumer habit;
selectively provide customer service in the virtual universe based on the consumer rating during the consumer session;
track the consumer session;
calculate a consumer rating for the consumer session using a combination of:
a point score for the consumer at a start of the consumer session;
a rating corresponding to whether the consumer session was successfully executed using the point score for the consumer at the start of the consumer session;
a rating corresponding to whether a real-time customer service representative (CSR) external to the virtual universe was used during the consumer session; and
a rating corresponding to whether a purchase was made by the customer during the consumer session; and
update a database with the calculated consumer rating for the consumer session.

* * * * *